(12) United States Patent
Takeuchi et al.

(10) Patent No.: US 11,027,623 B2
(45) Date of Patent: Jun. 8, 2021

(54) INFORMATION PROCESSING SERVER AND INFORMATION PROCESSING SYSTEM

(71) Applicant: HONDA MOTOR CO., LTD., Tokyo (JP)

(72) Inventors: Yuji Takeuchi, Tokyo (JP); Koji Sengoku, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 439 days.

(21) Appl. No.: 15/865,811

(22) Filed: Jan. 9, 2018

(65) Prior Publication Data

US 2018/0202826 A1    Jul. 19, 2018

(30) Foreign Application Priority Data

Jan. 19, 2017 (JP) .............................. JP2017-007983

(51) Int. Cl.
| | |
|---|---|
| *G01C 21/00* | (2006.01) |
| *B60L 53/60* | (2019.01) |
| *G01C 21/34* | (2006.01) |
| *G09B 29/10* | (2006.01) |
| *G01C 21/36* | (2006.01) |
| *G06F 16/487* | (2019.01) |

(52) U.S. Cl.
CPC .......... *B60L 53/60* (2019.02); *G01C 21/3469* (2013.01); *G09B 29/10* (2013.01); *G01C 21/3605* (2013.01); *G01C 21/3697* (2013.01); *G06F 16/487* (2019.01)

(58) Field of Classification Search
CPC ............ G01C 21/3469; G01C 21/3605; G01C 21/3697; B60L 53/60; G09B 29/10; G06F 16/487
See application file for complete search history.

(56) References Cited

U.S. PATENT DOCUMENTS

| | | | | |
|---|---|---|---|---|
| 2012/0176231 | A1* | 7/2012 | Skaff ...................... | B60K 35/00 340/439 |
| 2015/0100226 | A1* | 4/2015 | Skaff ...................... | G07C 5/004 701/123 |
| 2015/0283919 | A1* | 10/2015 | Baek ...................... | B60L 58/16 701/22 |

(Continued)

FOREIGN PATENT DOCUMENTS

| | | |
|---|---|---|
| JP | 2010-032363 A | 2/2010 |
| JP | 2016-062418 A | 4/2016 |

*Primary Examiner* — Masud Ahmed
(74) *Attorney, Agent, or Firm* — Squire Patton Boggs (US) LLP

(57) ABSTRACT

Provided is a system and the like which further improves the user-friendliness of checking the amount of energy charge (e.g., amount of refuelling) for a mobile body (e.g., a vehicle) by effectively utilizing a function of a mobile terminal (e.g., a smartphone). A present amount of refuelling $\Delta Fa(i)$ (present amount of energy charge) is estimated based on a deviation $\Delta D(i)$ and a fuel consumption $Fe(i)$ (travel efficiency) when the deviation $\Delta D(i)$ of a present drivable distance $D(i)$ from a last drivable distance $D(i-1)$ of a vehicle X becomes a threshold $\Delta Dth$ (>0) or higher. Accordingly, without the inconvenience that the user of the vehicle X inputs the fuelling amount into a mobile terminal 2 every time of refuel to the vehicle X, the estimation result of the fuelling amount can be automatically accumulated.

8 Claims, 4 Drawing Sheets

(56) References Cited

U.S. PATENT DOCUMENTS

2016/0019792 A1\* 1/2016 Kawamata .......... B60R 16/0236
                                                      701/70
2016/0216130 A1\* 7/2016 Abramson ......... G01C 21/3626
2017/0015328 A1\* 1/2017 Oguri ..................... B60W 20/00
2018/0066958 A1\* 3/2018 Choi .................. G01C 21/3469

\* cited by examiner

FIG.4

| Fuelling record |
|---|
| Input appropriate entries and click "Confirm" button.<br>(* is necessary) |

Fuelling date* : [   ] Year [ ] Month [ ] Date — W4
Total travel distance* : [   ] km
Fuelling situation [✓] Filled up
Fuel type* : [ ] Premium [✓] Regular [ ] Light diesel oil
Fuelling amount* : [   ] L
Paid amount : [   ]
GS/SS : [Select]
Memo [                    ]

[Cancel] [Confirm]

INFORMATION PROCESSING SERVER AND INFORMATION PROCESSING SYSTEM

BACKGROUND OF THE INVENTION

Field of the Invention

The present invention relates to a system that provides information pertaining to the remaining amount of energy in a vehicle using a function of a mobile terminal in cooperation with a vehicle.

Description of the Related Art

In view of removing a driver's anxiousness, a technique has been proposed that calculates the amount of fuel to be consumed until reaching a destination of a vehicle on the basis of fuel information and the road characteristics along the path, and displays the calculation result, during vehicle refuelling (see Japanese Patent Laid-Open No. 2010-032363). A vehicle-mounted device has been proposed that notifies fuelling necessity when the remaining amount of fuel or drivable distance of a vehicle becomes equal to or less than a predetermined value and the vehicle resides in a predetermined range with reference to a fuelling point (see Japanese Patent Laid-Open No. 2016-062418).

Unfortunately, improvement in user-friendliness of checking the amount of refuelling the vehicle has not been sufficiently discussed.

SUMMARY OF THE INVENTION

The present invention has an object to provide a system and the like that can further improve the user-friendliness of checking the amount of energy charge (e.g., amount of refuelling) to a mobile body (e.g., a vehicle) by effectively utilizing a function of a mobile terminal (e.g., a smartphone).

An information processing server of the present invention, comprises: an information input unit configured to recognize a deviation of a present drivable distance determined according to a present remaining amount of energy of a mobile body from a last drivable distance determined according to a last remaining amount of energy of the mobile body, and a travel efficiency that is an amount of energy consumption per a unit travel distance of the mobile body or a travel distance per a unit energy consumption of the mobile body, the deviation and the travel efficiency being issued from a mobile terminal cooperating with the mobile body; a determination unit configured to determine whether or not the deviation recognized by the information input unit is equal to or higher than a threshold that is a positive value; and an estimation unit configured to estimate a present amount of energy charge in the mobile body, based on the deviation and the travel efficiency of the mobile body recognized by the information input unit, in the case where the determination unit determines that the deviation is equal to or higher than the threshold.

An information processing system of the present invention comprises a mobile terminal cooperating with a mobile body, and an information processing server, wherein the mobile terminal comprises an input interface configured to allow the mobile terminal to receive the amount of energy charge of the mobile body from a user or a device mounted on the mobile body.

According to the information processing server and the information processing system of the present invention, in a case where the deviation of the present drivable distance from the last drivable distance of the mobile body is equal to or higher than a threshold that is a positive value, the present amount of energy charge is estimated on the basis of the deviation and the travel efficiency. The "last" and "present" mean that the drivable distance of a vehicle is repeatedly recognized (calculated or input) at designated timings, and the "present" number of repetitions is larger than the "last" number by "1". Accordingly, without the inconvenience that the user of the mobile body inputs the charge amount into the mobile terminal every time of energy charge to the mobile body, the estimation result of the charge amount can be automatically accumulated, thereby facilitating improvement in simplicity of checking the charge amount.

BRIEF DESCRIPTION OF THE DRAWINGS

FIG. 4 is an illustrative diagram pertaining to an input form of fuelling information in the mobile terminal.

DETAILED DESCRIPTION OF THE PREFERRED EMBODIMENTS (Configuration)

Figure 1:
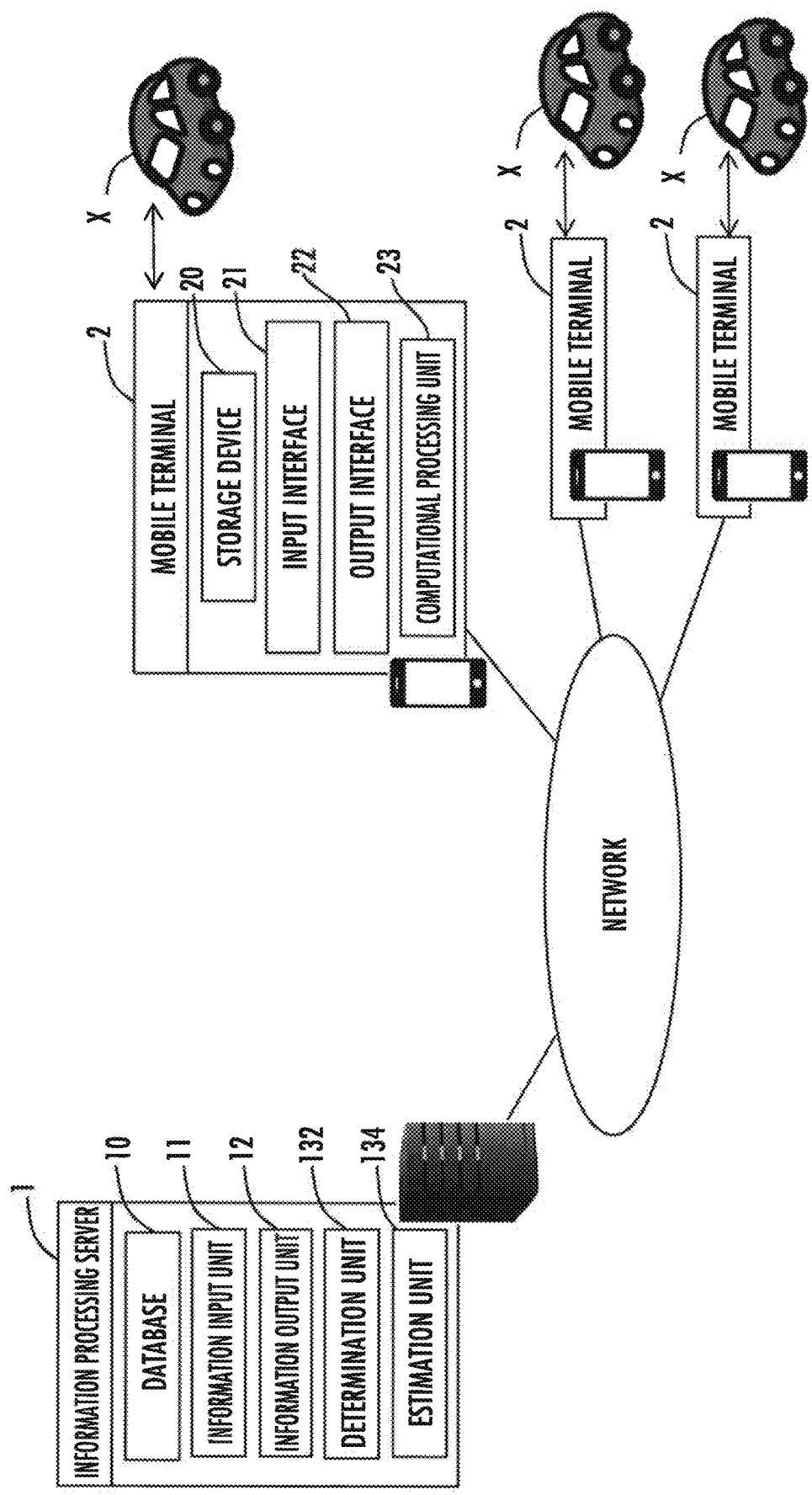
FIG. 1 is a diagram illustrating a configuration of an information processing system according to an embodiment of the present invention.

An information processing system shown in FIG. 1 comprises an information processing server 1 and a smartphone 2 as a mobile terminal, which communicate with each other via a network. The mobile terminal may be not only the smartphone 2 but also any information processing terminal, such as a tablet terminal, designed so as to have a size and weight that make the terminal carriable by a user. Embodiments are described for a case where the travel energy for a vehicle X is fuel (gasoline, or a fuel cell vehicle's fuel gas for a battery). Analogous description is also applicable to a case where the travel energy is electricity. A mobile body is not necessarily a "vehicle". Alternatively, the mobile body may be a "robot" having a moving function.

With an ignition switch of the vehicle X being at an ACC position or ON position, an ECU 30 (comprising a CPU and a memory, such as a ROM; a vehicle-mounted control device) is supplied with power from a vehicle-mounted battery. In this state, when the smartphone 2 resides in a range communicable with the ECU, the smartphone 2 and the vehicle X (more correctly, the ECU) are authenticated through communication and cooperation between the smartphone 2 and the vehicle X (more correctly, the vehicle-mounted ECU) is established. The cooperation between the smartphone 2 and the vehicle X allows the smartphone 2 and the vehicle X to communicate with each other and allows the vehicle X and an external device, such as the information processing server 1, to communicate with each other through the smartphone 2.

The information processing server 1 comprises a database 10, an information input unit 11, an information output unit 12, a determination unit 132, and an estimation unit 134. The database 10 is a storage device, and is configured to hold or store a vehicle identifier, and a remaining amount of fuel $\Delta F(i)$ of the vehicle X identified by the vehicle identifier, as well as various data items, such as maps including a road network made up of multiple links. The database 10 may comprise a database server that can communicate with the information processing server 1 via a network. Each of the information input unit 11, the information output unit 12, the determination unit 132, and the estimation unit 134 comprises a computational processing device, such as a CPU or a multi-core processor, and a memory, which are included in the information processing server 1, and is configured to execute a computational process, described later. The computational processing devices, which each constitute the information input unit 11, the information output unit 12, the determination unit 132, and the estimation unit 134, may be shared hardware or separated pieces of hardware.

The smartphone 2 has a function of measuring a self position using the GPS, and a function of communicating with external devices including the information processing server 1. The smartphone 2 comprises a storage device 20, an input interface 21, an output interface 22, and a computational processing unit 23.

The storage device 20 is configured to hold or store a vehicle identifier, and a remaining amount of fuel of the vehicle identified by the vehicle identifier, as well as various data items, such as maps including a road network made up of multiple links. The computational processing unit 23 comprises a computer (a computational processing device, such as a CPU or a multi-core processor, and a memory) constituting the smartphone 2, and is configured to execute the computational process, described later.

The input interface 21 comprises a display, and a touch panel switch configured integrally therewith, and allows a user to input information into the smartphone 2 and to issue an instruction. Various operations for the smartphone 2 are allowed, including a tap (a single tap, a double tap, and a long tap), a flick (an upward flick, a downward flick, a left flick, and a right flick), a swipe, a pinch (pinch-in and pinch-out), and a multi-touch. The input interface 21 may further comprise an audio input device (microphone). The output interface 22 comprises the display. The output interface 22 may further comprise an audio input device (loudspeaker).

The configuration elements of the present invention are programmed to read a program (including application software (hereinafter called an application)) from the memory, and to execute an information computing process in charge according to the program.

An operation that is to "recognize" information by the configuration element of the present invention means that the configuration element executes at least a part of the computational process for bringing the information into a usable state; that is, the configuration element receives the information, searches or reads the information from the inside or an external storage device (database etc.), calculates or estimates information by executing a computational process for basic information obtained through searching or the like, stores the information in the storage device.

(Operation)

An operation of the information processing system having the configuration described above is described.

Figure 2:
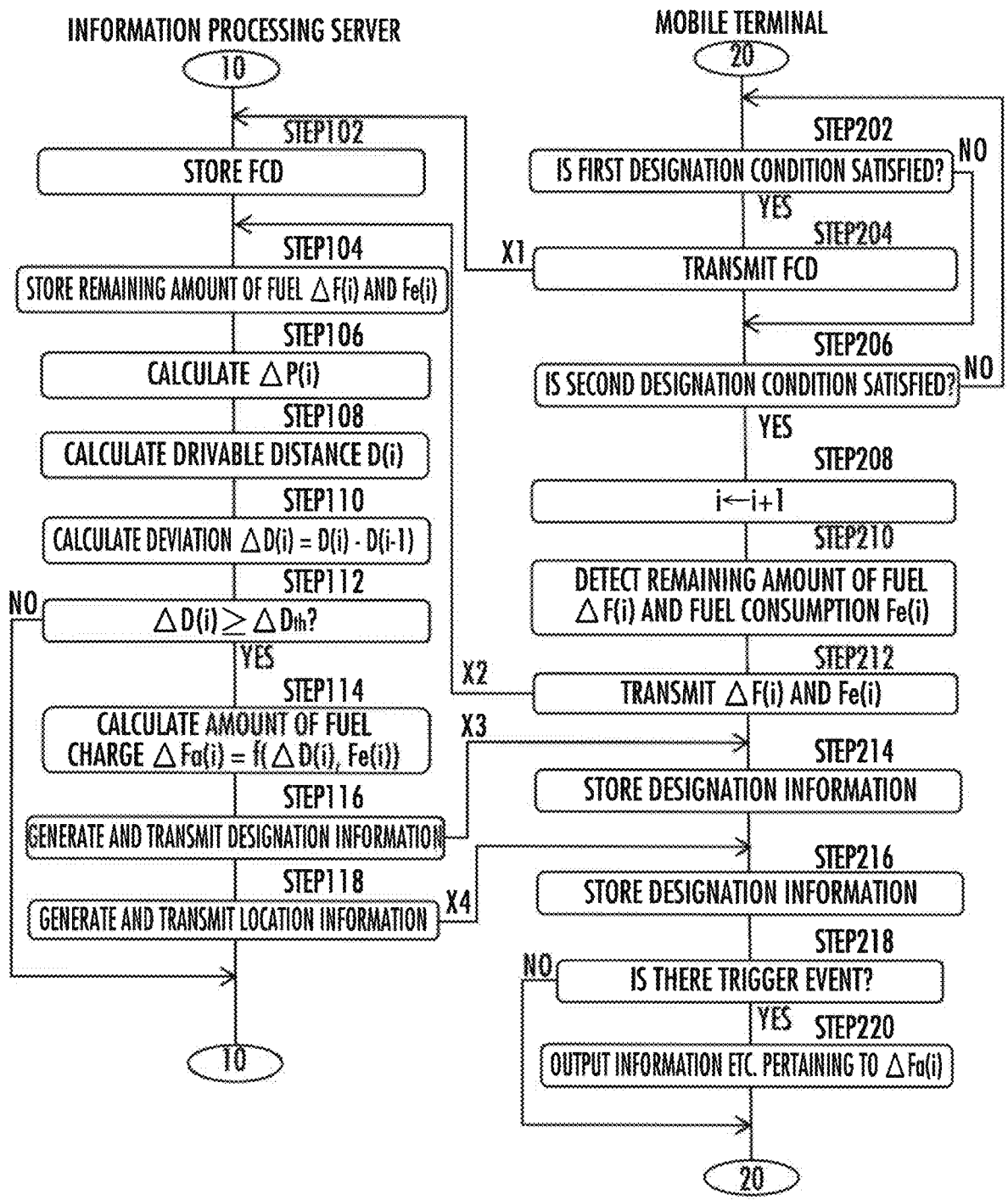
FIG. 2 is a diagram illustrating a function of the information processing system according to the embodiment of the present invention.

In a state where the smartphone 2 and the vehicle X cooperate with each other, the computational processing unit 23 determines whether a first designation condition is satisfied or not (STEP 202 in FIG. 2).

The "first designation condition" means that a timing at which the vehicle X transmits FCD (floating car data) or probe data to the information processing server 1 is reached. The FCD includes a time series of measured positions ((latitudes and longitudes) or (latitudes, longitudes and heights)) of the smartphone 2 or the vehicle X through a GPS function. For example, the fact that a certain time period has elapsed with reference to a time point of the last transmission of the FCD from the smartphone 2 to the information processing server 1, the vehicle X has traveled over a certain distance or longer, or the untransmitted amount of data of FCD has reached a certain value or more, is set as the first designation condition.

If the computational processing unit 23 determines that the first designation condition is satisfied (STEP 202 . . . YES in FIG. 2), the FCD is transmitted from the smartphone 2 to the information processing server 1 (STEP 204 in FIG. 2 and an arrow X1). In this case, the FCD accompanies an identifier for identifying the vehicle X or the smartphone 2. In response thereto, in the information processing server 1, the information input unit 11 receives the FCD and then causes the database 10 to store and hold the FCD (STEP 102 in FIG. 2).

Next, in the smartphone 2, the computational processing unit 23 determines whether a second designation condition is satisfied or not (STEP 206 in FIG. 2). Also if the first designation condition is determined not to be satisfied (STEP 202 . . . NO in FIG. 2), the process of determining the sufficiency of the second designation condition is executed (STEP 206 in FIG. 2).

The "second designation condition" means the fact that a timing at which the remaining amount of fuel $\Delta F(i)$ in the vehicle X is to be detected is reached. For example, the fact that the ON and OFF state of the IGN switch of the vehicle X has been switched, the vehicle X has traveled over a certain distance with reference to the last detection time point of the remaining amount of fuel $\Delta F(i)$, or the certain time period has elapsed, is set as the second designation condition. In a case where the smartphone 2 has a credit card transaction function, execution of the credit card transaction may be defined as the second designation condition. In this case, the smartphone 2 and the vehicle X do not necessarily cooperate with each other. Only if the smartphone 2 is in a power ON state, the sufficiency of the second designation condition can be determined.

If the second designation condition is determined not to be satisfied (STEP 206 . . . NO in FIG. 2), the process of determining the sufficiency of the first designation condition (STEP 202 in FIG. 2) and processes thereafter are executed. On the contrary, if the second designation condition is determined to be satisfied (STEP 206 . . . YES in FIG. 2), an indication "i" representing the number of detections of the remaining amount of fuel is incremented by "1" (STEP 208 in FIG. 2) and then the smartphone 2 detects the remaining amount of fuel $\Delta F(i)$ and fuel consumption $Fe(i)$ of the vehicle X through communication with the vehicle-mounted ECU (STEP 210 in FIG. 2). Furthermore, the smartphone 2 transmits the remaining amount of fuel $\Delta F(i)$ and fuel consumption $Fe(i)$ of the vehicle X to the information processing server 1 (STEP 212 in FIG. 2 and an arrow X2). The transmitted information is accompanied not only by the identifier for identifying the smartphone 2 or the vehicle X but also by the position measured through the smartphone 2 at the time point (the i-th time point $t(i)$) of detecting the remaining amount of fuel $\Delta F(i)$. The fuel consumption $Fe(i)$ of the vehicle X in a duration from the $(i-1)$-th time point $t(i-1)$ to the i-th time point $t(i)$ is measured by the vehicle-mounted ECU. For example, the average value of ratios of the fuel consumption to the travel distance of the vehicle X in multiple periods contained in the duration is calculated as the fuel consumption $Fe(i)$ of the vehicle X.

In response thereto, in the information processing server 1, the information input unit 11 receives the remaining amount of fuel $\Delta F(i)$ and fuel consumption $Fe(i)$ of the vehicle X and then causes the database 10 to store and hold the received data (STEP 104 in FIG. 2). The information input unit 11 calculates the travel distance $\Delta P(i)$ of the vehicle X from the (i−1)-th time point t(i−1) to the i-th time point t(i) (STEP 106 in FIG. 2). For example, the travel distance $\Delta P(i)$ of the vehicle X is calculated using the travel distance of the vehicle X (the indication of the odometer) transmitted from the vehicle X to the smartphone 2 at the i-th time point t(i) (accompanying the remaining amount of fuel $\Delta F(i)$ of the vehicle X). Alternatively, the travel distance $\Delta P(i)$ of the vehicle X may be calculated using the FCD of the vehicle X or the smartphone 2 accompanying this vehicle, and the map stored and held in the database 10.

Furthermore, the information input unit 11 calculates the drivable distance D(i) of the vehicle X (STEP 108 in FIG. 2). For example, the product of the fuel consumption $Fe(i)$ and remaining amount of fuel $\Delta F(i)$ of the vehicle X from the (i−1)-th time point t(i−1) to the i-th time point t(i) is calculated as the drivable distance D(i). The information input unit 11 calculates the deviation $\Delta D(i)=D(i)-D(i-1)$ of the present drivable distance D(i) from the last drivable distance D(i−1) (STEP 110 in FIG. 2).

The determination unit 132 determines whether or not the deviation $\Delta D(i)$ is equal to or higher than a threshold $\Delta Dth$, which is a positive value (STEP 112 in FIG. 2). The threshold $\Delta Dth$ may be set to a value that is equal to or higher than the travel distance $\Delta P(i)$ of the vehicle X from the (i−1)-th time point t(i−1) to the i-th time point t(i), for example. If the determination result is negative (STEP 112 . . . NO in FIG. 2), the information processing server 1 repeatedly executes the computational process described above (see STEPS 102 to 112 in FIG. 2). On the contrary, if the determination result is affirmative (STEP 112 . . . YES in FIG. 2), the estimation unit 134 estimates the amount of fuel charge $\Delta Fa(i)$ in the duration from the (i−1)-th time point t(i−1) to the i-th time point t(i) (STEP 114 in FIG. 2) on the basis of the deviation $\Delta D(i)$ and the fuel consumption $Fe(i)$ of the vehicle X. For example, $\Delta D(i)/Fe(i)$ or $\{\Delta D(i)-\Delta P(i)\}/Fe(i)$ is estimated as the amount of fuel charge $\Delta Fa(i)$ in the duration.

The information output unit 12 generates the information pertaining to the amount of fuel charge $\Delta Fa(i)$ estimated by the estimation unit 134, as designation information, and then transmits the designation information to the smartphone 2 identified by the corresponding identifier (STEP 116 in FIG. 2 and an arrow X3). In response thereto, in the smartphone 2, the designation information is stored and held in the storage device 20 (STEP 214 in FIG. 2). For example, information that represents the time series of the amounts of fuel charge $\Delta Fa(i)$ over a past certain duration, such as the past one month or the past half a year is generated as the designation information.

The information output unit 12 generates the location information corresponding to the position of the smartphone 2 or the vehicle X at the i-th time point t(i) in a case where the deviation $\Delta D(i)$ is determined to be equal to or higher than the threshold $\Delta Dth$ by the determination unit 132, on the basis of a search of the database 10, and transmits the generated information to the corresponding smartphone 2 (STEP 118 in FIG. 2 and an arrow X4). In response thereto, in the smartphone 2, the location information is stored and held in the storage device 20 (STEP 216 in FIG. 2). For example, information that includes the contact, such as the name, address and phone number, and business hours of a refuel station or service station that resides at the position, is generated as location information.

The computational processing unit 23 determines whether a trigger event has been present in the smartphone 2 or not (STEP 218 in FIG. 2). For example, the fact that a predetermined input operation has been made by the user through the input interface 21, is set as a "trigger event". If the determination result is affirmative (STEP 218 . . . YES in FIG. 2), the computational processing unit 23 reads the designation information and the location information from the storage device 20 and then causes the output interface 22 to output and display the read information (STEP 220 in FIG. 2).

Figure 3:
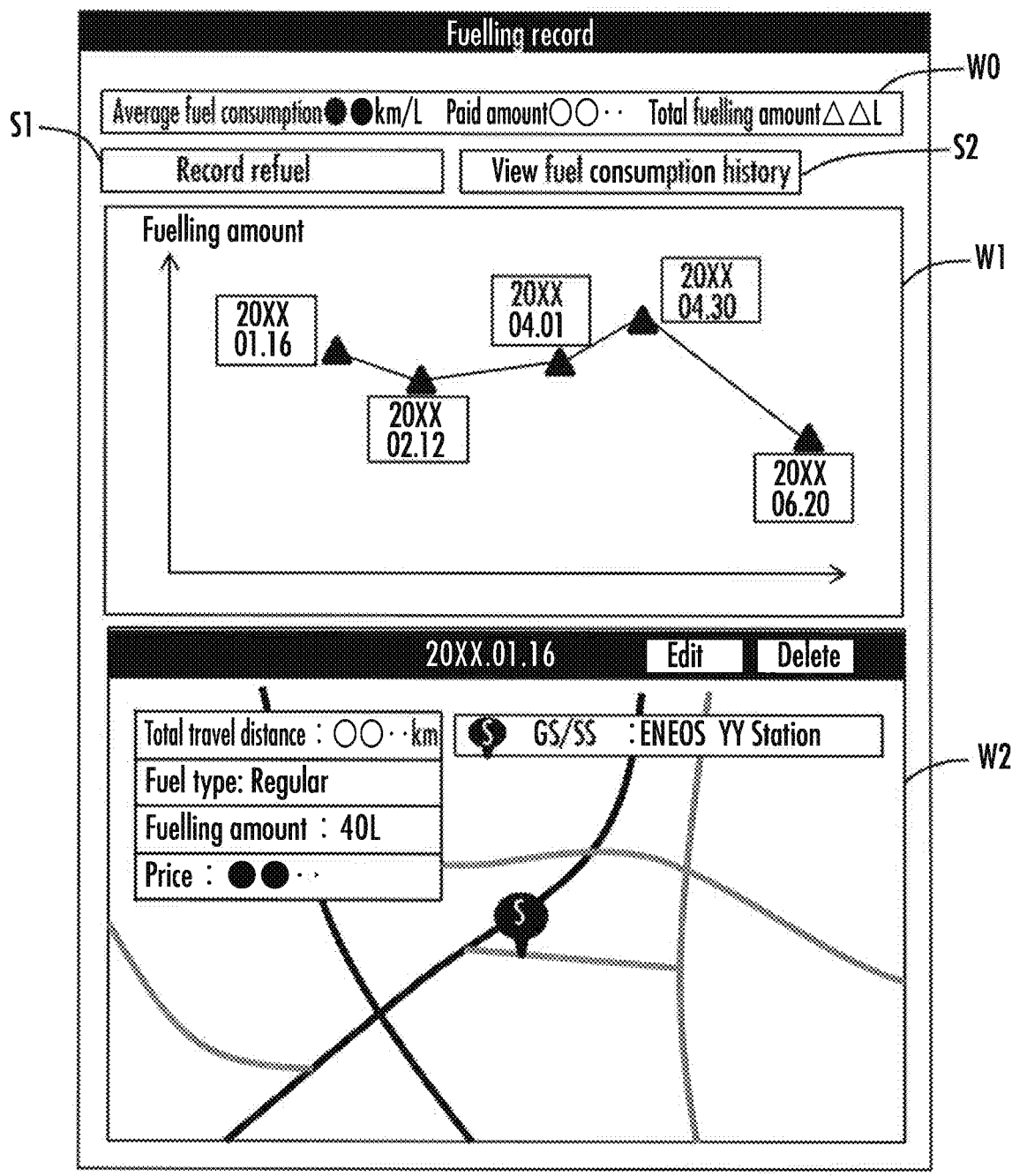
FIG. 3 is an illustrative diagram pertaining to an output form of designation information in a mobile terminal.

Accordingly, for example, an image as described in FIG. 3 is displayed on the smartphone 2. The average fuel consumption of the vehicle X, paid amount, and total fuelling amount (amount of fuel charge) are displayed in an area W0. The areas S1 and S2 function as the respective touch buttons to which "Record refuel" and "View fuel consumption history" are attached. A time series of fuelling amount, which serves as the designation information, is displayed in a line graph shape, in an area W1. Information pertaining to a facility that is a refuel station or the like at the i-th time point t(i), which serves as location information, such as a map indicating the location site of the facility is indicated in an area W2.

An input interface is provided that allows the user to input the fuelling history information into the smartphone 2 in response to a touch operation on a touch button (area S1 in FIG. 3) that is "Record refuel". Accordingly, for example, as shown in FIG. 4, a window W4 that can receive multiple items pertaining to the fuelling record, such as "Fuelling date", "Total travel distance (of the vehicle X on the fuelling date)", and "Fuelling amount", directly or through selection from a pull-down menu, is displayed on the smartphone 2.

The fuelling amount input as the required item into the smartphone 2 according to the window W4 is transmitted as "the amount of fuel charge input by the user" from the smartphone 2 to the information processing server 1. In a case where the fuelling date corresponding to the amount of fuel charge is between the (j−1)-th time point t(j−1) and j-th time point t(j), the j-th time point t(j) is shifted to the (j+1)-th time point t(j+1), and this fuelling date is defined as a new j-th time point t(j) and then is stored and held in the database 10. The designation information is generated that includes the amount of fuel charge $\Delta Fa(i)$ for the vehicle X estimated by the estimation unit 134 (see STEP 114 in FIG. 2), and the amount of fuel charge $\Delta Fa(j)$ input by the user in a manner discriminated from each other, as described above (see STEP 116 in FIG. 2).

In a case where the designation information is displayed on the smartphone 2 (see the area W1 in FIG. 3), a plot that represents the amount of fuel charge $\Delta Fa(i)$ for the vehicle X estimated by the estimation unit 134, and a plot that represents the amount of fuel charge $\Delta Fa(j)$ input by the user are output to the output interface 22 of the smartphone 2 in a manner capable of being identified by the color, shape (including size) or a pattern or a combination thereof. In this case, as shown in FIG. 3, the location information pertaining to the refuel station input by the user can be displayed in the area W2.

(Advantageous Effects)

The information processing system that achieves the function described above estimates the present amount of refuelling $\Delta Fa(i)$ (present amount of energy charge) on the basis of the deviation $\Delta D(i)$ and the fuel consumption $Fe(i)$ (travel efficiency) when the deviation $\Delta D(i)$ of the present drivable distance D(i) from the last drivable distance D(i−1) of the vehicle X (mobile body) becomes the threshold ΔDth (>0) or higher (see STEP 112 . . . YES→STEP 114 in FIG. 2). Accordingly, without the inconvenience that the user of the vehicle X inputs the fuelling amount into the mobile terminal 2 every time of refuel to the vehicle X, the estimation result of the fuelling amount can be automatically accumulated, thereby facilitating improvement in simplicity of checking the fuelling amount (see the area W1 in FIG. 3).

What is claimed is:

1. An information processing server, comprising:
   an information input unit configured to recognize a deviation of a present drivable distance determined according to a present actual remaining amount of energy at a present time point of a mobile body from a last drivable distance determined according to a last actual remaining amount of energy at a last time point of the mobile body, and a travel efficiency that is an amount of energy consumption per a unit travel distance of the mobile body or a travel distance per a unit energy consumption of the mobile body, the deviation and the travel efficiency being issued from a mobile terminal cooperating with the mobile body, the mobile terminal being separated from the mobile body;
   a determination unit configured to determine whether or not the deviation recognized by the information input unit is equal to or higher than a threshold that is a positive value;
   an estimation unit configured to estimate a present amount of energy charge completed between the last time point and the present time point in the mobile body, by dividing the deviation by the travel efficiency of the mobile body recognized by the information input unit or by subtracting the travel distance between the last time point and the present time point from the deviation and dividing by the travel efficiency, in the case where the determination unit determines that the deviation is equal to or higher than the threshold; and
   an information output unit configured to transmit the present amount of energy charge estimated by the estimation unit to the mobile terminal.

2. The information processing server according to claim 1, further comprising
   an information output unit configured to provide the mobile terminal with designation information that includes an amount of energy charge in the mobile body estimated by the estimation unit.

3. The information processing server according to claim 2,
   wherein the information output unit provides the mobile terminal with, as the designation information, information pertaining to a time series of the amount of energy charge in the mobile body, including the amount of energy charge in the mobile body estimated by the estimation unit.

4. The information processing server according to claim 2,
   wherein the information output unit provides the mobile terminal with the designation information that includes the amount of energy charge in the mobile body estimated by the estimation unit, and the amount of energy charge in the mobile body input into the mobile terminal and issued from the mobile terminal, in a discriminable manner.

5. The information processing server according to claim 2,
   wherein in the case where the determination unit determines that the deviation is equal to or higher than the threshold, the information input unit recognizes location information pertaining to a location position of the mobile terminal at a time point of this case, and
   the information output unit provides the mobile terminal with a location information on the mobile body recognized by the information input unit.

6. An information processing system comprising a mobile terminal cooperating with a mobile body, and an information processing server,
   the information processing server, comprising:
   an information input unit configured to recognize a deviation of a present drivable distance determined according to a present actual remaining amount of energy at a present time point of the mobile body from a last drivable distance determined according to a last actual remaining amount of energy at a last time point of the mobile body, and a travel efficiency that is an amount of energy consumption per a unit travel distance of the mobile body or a travel distance per a unit energy consumption of the mobile body, the deviation and the travel efficiency being issued from the mobile terminal cooperating with the mobile body, the mobile terminal being separated from the mobile body;
   a determination unit configured to determine whether or not the deviation recognized by the information input unit is equal to or higher than a threshold that is a positive value;
   an estimation unit configured to estimate a present amount of energy charge completed between the last time point and the present time point in the mobile body, by dividing the deviation by the travel efficiency of the mobile body recognized by the information input unit or by subtracting the travel distance between the last time point and the present time point from the deviation and dividing by the travel efficiency, in the case where the determination unit determines that the deviation is equal to or higher than the threshold; and
   an information output unit configured to transmit the present amount of energy charge estimated by the estimation unit to the mobile terminal,
   wherein the mobile terminal comprises an input interface configured to allow the mobile terminal to receive the amount of energy charge of the mobile body from a user or a device mounted on the mobile body.

7. The information processing system according to claim 6,
   the information processing server further comprises an information output unit configured to provide the mobile terminal with designation information that includes an amount of energy charge in the mobile body estimated by the estimation unit, based on communication with the mobile terminal, and
   the mobile terminal further comprises an output interface configured to output the designation information.

8. The information processing system according to claim 7,
   wherein the output interface of the mobile terminal outputs the designation information in a manner capable of identifying an entity of inputting the amount of energy charge in the mobile body into the input interface.

* * * * *